US009256954B2

(12) United States Patent
Nakamura

(10) Patent No.: US 9,256,954 B2
(45) Date of Patent: Feb. 9, 2016

(54) IMAGE ANALYSIS APPARATUS TO ANALYZE STATE OF PREDETERMINED OBJECT IN IMAGE

(71) Applicant: CASIO COMPUTER CO., LTD., Shibuya-ku, Tokyo (JP)

(72) Inventor: Yoshiaki Nakamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 134 days.

(21) Appl. No.: 14/139,654

(22) Filed: Dec. 23, 2013

(65) Prior Publication Data

US 2014/0185881 A1 Jul. 3, 2014

(30) Foreign Application Priority Data

Dec. 28, 2012 (JP) ................................. 2012-288971

(51) Int. Cl.
*G06K 9/00* (2006.01)
*G06T 7/20* (2006.01)

(52) U.S. Cl.
CPC ..... *G06T 7/2013* (2013.01); *G06T 2207/10016* (2013.01); *G06T 2207/20021* (2013.01); *G06T 2207/30224* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,607,925 A | * | 8/1986 | Kamigaichi et al. | 396/19 |
| 6,594,590 B2 | * | 7/2003 | Woods et al. | 702/35 |
| 6,943,675 B2 | * | 9/2005 | Petersen et al. | 340/453 |
| 7,187,273 B2 | * | 3/2007 | Rieck et al. | 340/443 |
| 2002/0189336 A1 | * | 12/2002 | McEwan | 73/146 |
| 2003/0058091 A1 | * | 3/2003 | Petersen et al. | 340/457.3 |
| 2004/0168512 A1 | * | 9/2004 | McEwan | 73/146 |
| 2006/0128489 A1 | * | 6/2006 | Mooney et al. | 473/139 |
| 2007/0060416 A1 | * | 3/2007 | Watanabe et al. | 473/371 |
| 2010/0298070 A1 | * | 11/2010 | Higuchi et al. | 473/384 |
| 2013/0090189 A1 | * | 4/2013 | Felker et al. | 473/383 |
| 2014/0145876 A1 | * | 5/2014 | Friend et al. | 342/357.35 |

FOREIGN PATENT DOCUMENTS

| | | |
|---|---|---|
| JP | 02057486 A | 2/1990 |
| JP | 2008236124 A | 10/2008 |
| JP | 2009247642 A | 10/2009 |
| JP | 2011-240087 A | 12/2011 |
| JP | 2012247209 A | 12/2012 |

OTHER PUBLICATIONS

Japanese Office Action (and English translation thereof) dated Apr. 21, 2015, issued in counterpart Japanese Application No. 2012-288971.

* cited by examiner

*Primary Examiner* — Anand Bhatnagar
(74) *Attorney, Agent, or Firm* — Holtz, Holtz & Volek PC

(57) ABSTRACT

An image-capture device 1 includes: an image acquisition unit 111 that acquires a plurality of images that are successively captured; an identification unit 112 that identifies a golf ball B as a predetermined object in each of the plurality of images; a rotation calculation unit 113 that calculates the number of rotations of the predetermined object; a movement amount calculation unit 114 that calculates a total movement amount that the golf ball B has moved; and a slippage amount calculation unit 115 that calculates a slippage amount based on the number of rotations as well as the total movement amount.

14 Claims, 14 Drawing Sheets

IMAGE ANALYSIS APPARATUS TO ANALYZE STATE OF PREDETERMINED OBJECT IN IMAGE

This application is based on and claims the benefit of priority from Japanese Patent Application No. 2012-288971, filed on 28 Dec. 2012, the content of which is incorporated herein by reference.

BACKGROUND OF THE INVENTION

1. Field of the Invention

The present invention relates to an image analysis apparatus, an information notification apparatus, an image analysis method, an information notification method, and a storage medium, that analyze or notify a state of a predetermined object in an image.

2. Related Art

An apparatus that automatically captures, analyzes, and notifies a user of motion of an object, as a golf practice tool, is known heretofore. Known art regarding such a tool is, for example, a golf putting practice device disclosed in Japanese Unexamined Patent Application Publication No. 2011-240087.

The golf putting practice device disclosed in the above-mentioned patent document allows a user to practice putting-distance control by detecting degree of swing back from a putting base point.

SUMMARY OF THE INVENTION

An image analysis apparatus including: an image acquisition unit that acquires a plurality of images that are successively captured; an identification unit that identifies a predetermined object in each of the plurality of images; a rotation calculation unit that calculates the number of rotations of the predetermined object; a first distance calculation unit that calculates a first distance that the predetermined object has moved; and a slippage amount calculation unit that calculates a slippage amount of the predetermined object based on the number of rotations and the first distance. An image analysis method performed by an image analysis apparatus that analyzes an image, comprising: an image acquisition step of acquiring a plurality of images that are successively captured; an identification step of identifying a predetermined object in each of the plurality of images acquired in the image acquisition step; a rotation calculation step of calculating the number of rotations of the predetermined object identified in the identification step; a first distance calculation step of calculating a distance that the predetermined object has moved; and a slippage amount calculation step of calculating a slippage amount of the predetermined object based on the number of rotations calculated in the rotation calculation step and the distance calculated in the first distance calculation step. A non-transitory storage medium that stores a computer readable program, the program making a computer execute functions of: an image acquisition unit that acquires a plurality of images that are successively captured; an identification unit that identifies a predetermined object in each of the plurality of images; a rotation calculation unit that calculates the number of rotations of the predetermined object; a first movement amount calculation unit that calculates a distance that the predetermined object has moved; and a slippage amount calculation unit that calculates a slippage amount of the predetermined object based on the number of rotations calculated by the rotation calculation unit and the distance calculated by the first movement amount calculation unit. An information notification method performed by an information notification apparatus, including: an acquisition step of acquiring information regarding a slippage amount of a predetermined object; and a notification step of notifying the information regarding a slippage amount acquired in the acquisition step. A non-transitory storage medium that stores a computer readable program, the program making a computer execute functions of: an acquisition unit that acquires information regarding a slippage amount of a predetermined object; and a notification unit that notifies the information regarding a slippage amount acquired by the acquisition unit.

DETAILED DESCRIPTION OF THE INVENTION

Embodiments of the present invention are hereinafter described with reference to the drawings.

Figure 1:
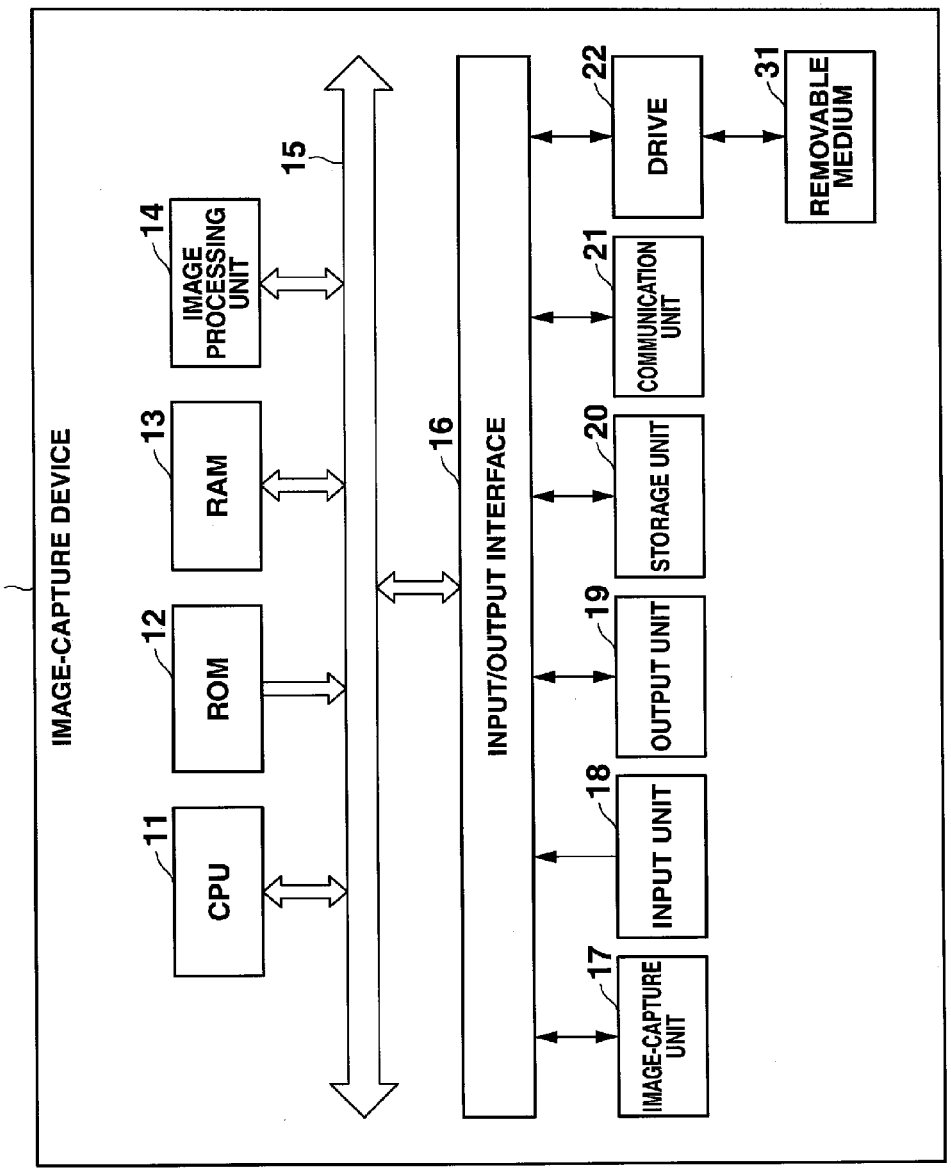
FIG. 1 is a block diagram of a hardware configuration of an image-capture device according to an embodiment of an image analysis apparatus and an information notification apparatus of the present invention.

FIG. 1 is a block diagram of a hardware configuration of an image-capture device according to an embodiment of an image analysis apparatus and an information notification apparatus of the present invention.

The image-capture device 1 is configured as, for example, a digital camera.

The image-capture device 1 includes a CPU (Central Processing Unit) 11, ROM (Read Only Memory) 12, RAM (Random Access Memory) 13, an image processing unit 14, a bus 15, an input/output interface 16, an image capture unit 17, an input unit 18, an output unit 19, a storage unit 20, a communication unit 21, and a drive 22.

The CPU 11 executes various processes in accordance with a program stored in the ROM 12 or a program loaded from the storage unit 20 to the RAM 13.

The RAM 13 also stores data and the like necessary for the CPU 11 to execute the various processing, as appropriate.

The image processing unit 14 performs various image processing such as color correction, smoothing, and pattern matching on various image data.

The CPU 11, the ROM 12, the RAM 13 and the image processing unit 14 are connected to one another via the bus 15. The input/output interface 16 is also connected to the bus 15. The image capture unit 17, the input unit 18, the output unit 19, the storage unit 20, the communication unit 21, and the drive 22 are connected to the input/output interface 16.

The image capture unit 17 includes an optical lens unit and an image sensor, which are not illustrated.

In order to capture an image of a subject, the optical lens unit is configured by a lens for condensing light, such as a focus lens or a zoom lens.

The focus lens is a lens for forming an image of a subject on a light receiving surface of the image sensor. The zoom lens is a lens by which the focal length is freely changed within a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device or the like, for example. Light incident through the optical lens unit forms an image of a subject in the optoelectronic conversion device. The optoelectronic conversion device optoelectronically converts the image of the subject, stores the resultant image signal for a predetermined time interval, and sequentially supplies the stored image signal as an analog signal to the AFE.

The AFE executes a variety of signal processing such as A/D (Analog/Digital) conversion processing of the analog signal. The variety of signal processing generates a digital signal that is output as an output signal from the image capture unit 17.

Such an output signal of the image capture unit 17 is hereinafter referred to as "data of a captured image". The data of a captured image is supplied to the CPU 11, the image processing unit 14 or the like as appropriate.

The input unit 18 is configured by various buttons or the like, and inputs a variety of information in accordance with instruction operations by the user.

The output unit 19 is configured by a display unit, a speaker, and the like, and outputs images and sound.

The storage unit 20 is configured by a hard disk, DRAM (Dynamic Random Access Memory) or the like, and stores data of various images.

The communication unit 21 controls communication with other devices (not illustrated) via networks including the Internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

Figure 2:
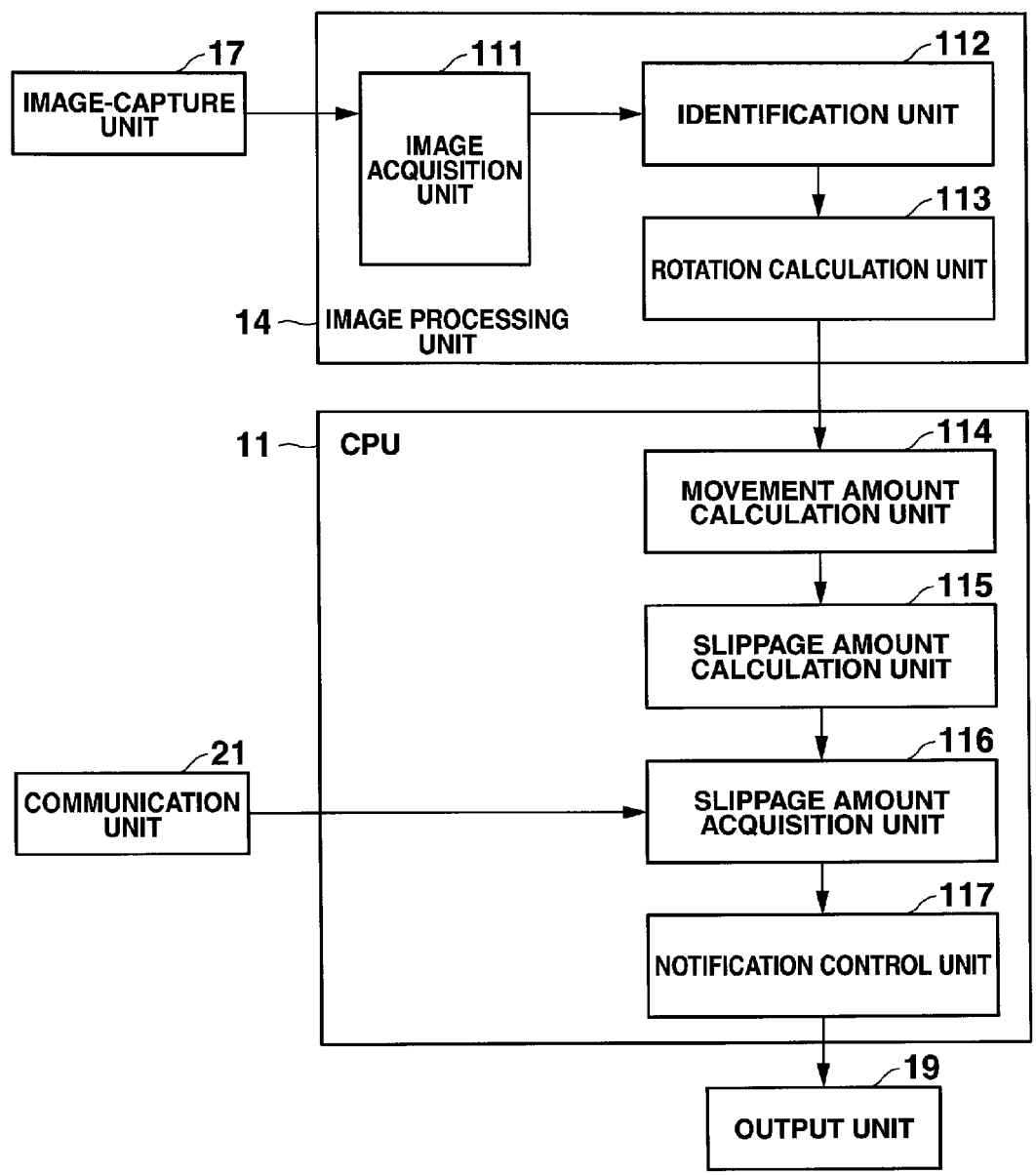
FIG. 2 is a functional block diagram of a functional configuration for executing an image analysis process and an information notification process among functional configurations of the image-capture device shown in FIG. 1.

FIG. 2 is a functional block diagram showing a functional configuration for executing image analysis processing, among the functional configurations of the image-capture device 1.

The image analysis processing indicates a series of processes of: calculating distance that a predetermined object has moved by rotating (rotational movement amount) based on the number of rotations of the predetermined object, by determining the position and size of the predetermined object in a series of captured images that are successively captured; calculating a slippage amount by subtracting virtual rotational movement amount that the predetermined object moves only by rotational motion from total movement amount that the predetermined object has actually moved; and notifying the slippage amount thus calculated.

The image analysis processing includes a process of calculating the slippage amount (hereinafter referred to as "slippage amount calculation process") and a process of notifying a user of the slippage amount (hereinafter referred to as "slippage amount notification process").

Here, the term "slippage amount" indicates amount of movement that does not involve rotation (amount the object has moved while slipping) out of the total movement amount, when the predetermined object moves while in contact with a surface such as the ground.

In the present embodiment, a golf ball is employed as the predetermined object.

More specifically, in the present embodiment, in a golf practice field and the like, the image-capture device 1 is fixed above a space in which a user practices putting (hereinafter referred to as "putting space"). In other words, the image-capture device 1 captures a moving image of the putting space from above within an angle of view (hereinafter also referred to as "capture range").

Here, the moving image is configured by arranging a plurality of images (hereinafter referred to as "unit image") corresponding to a frame or field or the like. In the present embodiment, a frame is employed as the unit image. In the present specification, the frame is referred to as "frame image" for convenience.

In the present embodiment, the image-capture device 1 executes the following series of steps as the slippage amount calculation process.

Namely, when a user putts, the image-capture device 1 captures a moving image of a golf ball moving in the putting space. More accurately, a moving image of the golf ball moving within the capture range in the putting space is obtained.

The image-capture device 1 calculates total distance that the golf ball has moved within the capture range (hereinafter referred to as "total movement amount") as well as a distance that the golf ball has moved while rotating (hereinafter referred to as "rotational movement amount") based on the moving image.

The image-capture device 1 then calculates the slippage amount of the golf ball by subtracting the rotational movement amount from the total movement amount.

In the present embodiment, after the above described slippage amount calculation process, the image-capture device 1 executes a slippage amount notification process for notifying the user of the slippage amount, by outputting an image and sound indicating the slippage amount from the output unit 19 (see FIG. 1).

In a case of controlling the slippage amount calculation process, as shown in FIG. 2, an image acquisition unit 111, an identification unit 112, and a rotation calculation unit 113 function in the image processing unit 14; and a movement amount calculation unit 114 and the slippage amount calculation unit 115 function in the CPU 11. Furthermore, in a case of controlling execution of the slippage amount calculation process, a slippage amount acquisition unit 116 and a notification control unit 117 function in the CPU 11.

The image acquisition unit 111 sequentially acquires, and provides the identification unit 112 with, each item of data of the plurality of frame images that constitute a moving image and are sequentially output by the image-capture unit 17.

The identification unit 112 identifies an object that moves by rotating, which is a golf ball in the present embodiment, from each item of data of the plurality of frame images that have been acquired by the image acquisition unit 111. More accurately, the identification unit 112 identifies a group of data of a series of frame images including a moving golf ball, among the data of the moving image that is output by the image-capture unit 17.

Figure 3:
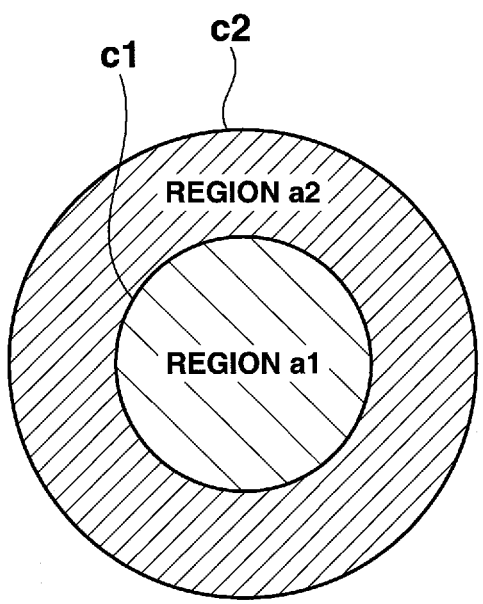
FIG. 3 is a diagram schematically illustrating a separability filter that is used for detection of a golf ball image in the image-capture device of FIG. 2.

FIG. 3 is a diagram for describing an example of a method of detecting a golf ball image in the frame images, schematically illustrating a separability filter that is used for detection of a golf ball image.

The identification unit 112 can identify a golf ball image in the frame image by applying the circular separability filter as shown in FIG. 3 to data of the frame images, thereby calculating the separability. Here, the "separability" is a parameter indicating separability in region information between two localized regions, a regional a1 and a region a2 as shown in FIG. 3. The circular separability filter is employed in the identification unit 112 for identifying the position of the golf ball image, since the golf ball image does not much depend on brightness of the two regions a1 and a2 and is not easily affected by noise.

In the present embodiment, a target of identification is a circular golf ball image in the frame image. Therefore, in the circular separability filter of the present embodiment, the regional, which is the inner area of the contour of a circle c1, and the region a2, which is the area between the contour of the circle c1 and the contour of a circle c2, are employed as two localized regions. In addition, in the present embodiment, values of brightness, chromaticity, and saturation are employed, among data of each pixel value in the frame image, as the region information.

In a case in which the normalized region information is completely separated between the regional and the region a2 as a result of applying the circular separability filter shown in FIG. 3 to the data of the frame image to be processed, the identification unit 112 calculates the separability to be 1.0, which is the maximum value. On the other hand, in a case in which the region information cannot be separated as a result of applying the circular separability filter shown in FIG. 3 to the data of the frame image to be processed, the identification unit 112 calculates the separability to be 0.0, which is the minimum value, or a value close thereto.

More specifically, the separability μ is obtained by Equation (1), Equation (2) and Equation (3) shown below.

$$\mu = \frac{\sigma_b^2}{\sigma_T^2} \quad (1)$$

$$\sigma_b^2 = n_1(\overline{P_1} - \overline{P_m})^2 + n_1(\overline{P_2} - \overline{P_m})^2 \quad (2)$$

$$\sigma_T^2 = \sum_{i=1}^{N}(P_i - \overline{P_m})^2 \quad (3)$$

Here, in Equation (1), σT indicates total variance value of the regional and the region a2, and σb indicates an interclass variance value of the region a1 and the region a2.

Where a group is divided into a plurality of subgroups (referred to as classes), interclass variance is an amount that represents degree of variance of averages of the subgroups around an average of the group.

In Equation (2), n1 indicates the total number of pixels in the region a1 and n2 indicates the total number of pixels in the region a2. P1 with an overline indicates an average of respective pixel values in the regional; P2 with an overline indicates an average of respective pixel values in the region a2; and Pm with an overline indicates an average of respective pixel values of the regional and the region a2.

In Equation (3), N indicates the total number of pixels in the regional and the region a2; and Pi indicates the pixel value at a pixel position i in the frame image.

The identification unit 112 sequentially applies the circular separability filter to the frame image to be processed, while changing the size of the regional and the region a2, and sequentially calculates the above Equations (1) to (3), to thereby sequentially obtain the separability. The identification unit 112 can then identify the size and position of the golf ball image in the frame image to be processed, based on the size and position of the regional showing the greatest separability.

Among the data of the moving image output by the image-capture unit 17, the initial frame image data includes a golf ball image that is stationary at a predetermined position in the putting space. This is because the user has not started putting. It is determined that the initial frame images do not include the moving golf ball image. The stationary position of the golf ball before the start of putting is hereinafter referred to as an "initial position". The initial position can be indicated either by an actual position of the golf ball in the putting space, or a position of the golf ball image in the frame image.

The identification unit 112 detects the golf ball image that is stationary at the initial position, and defines the frame image including the golf ball image as the initial frame image.

Thereafter, when the user starts putting and the head of a golf club hits the golf ball, the golf ball starts moving in the putting space. A frame image at the moment of start of movement, in other words a frame image at the timing of impact with the golf ball at the initial position, is hereinafter referred to as an "impact frame image".

The identification unit 112 identifies data of a frame image, which is first determined to include the moving golf ball image, as data of the impact frame image.

More specifically, for example, with a processing target of data of the frame images that are sequentially output by the image acquisition unit 111 following the data of the frame image in which the initial position is identified (as a reference), the identification unit 112 calculates difference of respective characteristic amounts between the reference and the processing target, while limiting a scan area to the vicinity of the initial position of the golf ball. The identification unit 112 detects the data of the impact frame image based on a result of the calculation. In other words, in the impact frame image, the golf ball image that has been at the initial position in the reference frame image moves as the golf ball is hit by the golf club, and then disappears from the region including the initial position. As a result, the characteristic amount difference for the region including the initial position becomes a maximum value (for example, 1). Given this, the identification unit 112 identifies, as data of the impact frame image, the data of the frame image in which the characteristic amount difference for the region including the initial position is the maximum value.

Figure 4:
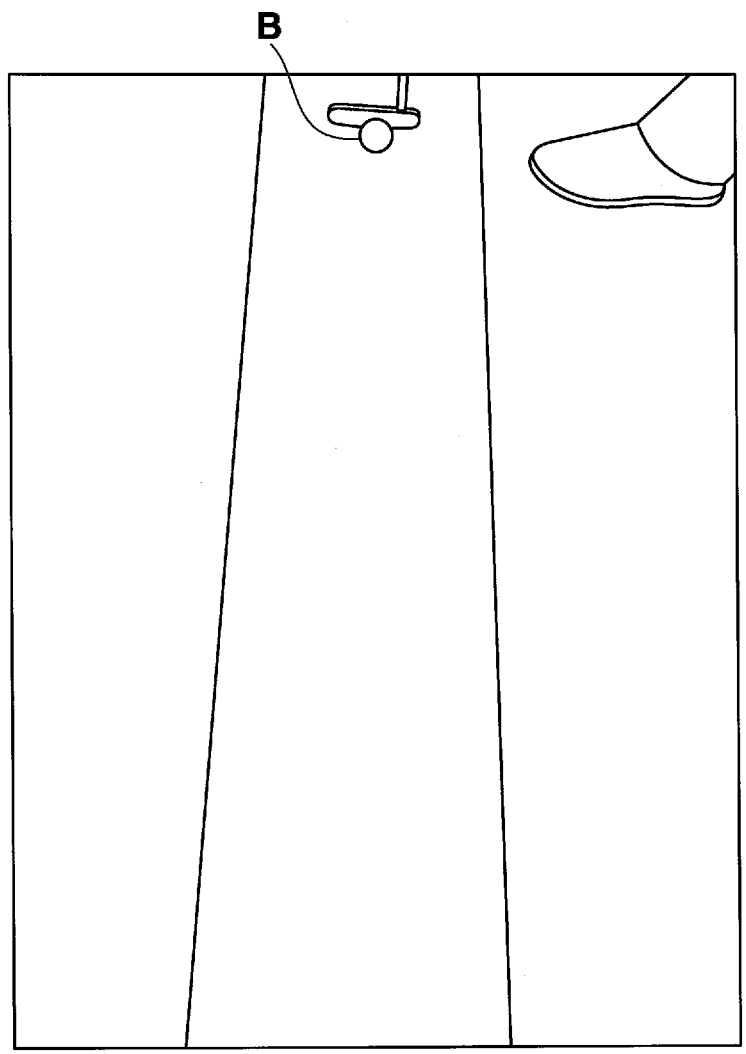
FIG. 4 is a diagram illustrating an example of an impact frame image that is processed by the image-capture device of FIG. 2.

FIG. 4 is a diagram illustrating an example of the impact frame image.

As shown in FIG. 4, in the impact frame image, the golf ball image is about to start moving as the golf ball is hit by the head of the golf club.

Returning to FIG. 2, the identification unit 112 applies the separability filter to each item of data of the frame images that are successively output by the image acquisition unit 111 following the data of the impact frame image, to thereby identify the position and size of a golf ball B. By repeating such identification, the golf ball B moves and disappears from the capture range of the image-capture device 1. Data of a frame image in which the position and size of the golf ball B cannot be identified, in other words the separability is 0 or a value close thereto (no greater than a predetermined threshold) is thus detected. Given this, the identification unit 112 identifies frame images, in which the separability starts to decrease, of 2 or 3 frames before the first frame image in which the separability becomes 0 or a value close thereto (no greater than a predetermined threshold), as data of frame images in which the golf ball B is exiting the capture range of the image-capture device 1 (hereinafter referred to as an "out-of-frame image").

Figure 5:
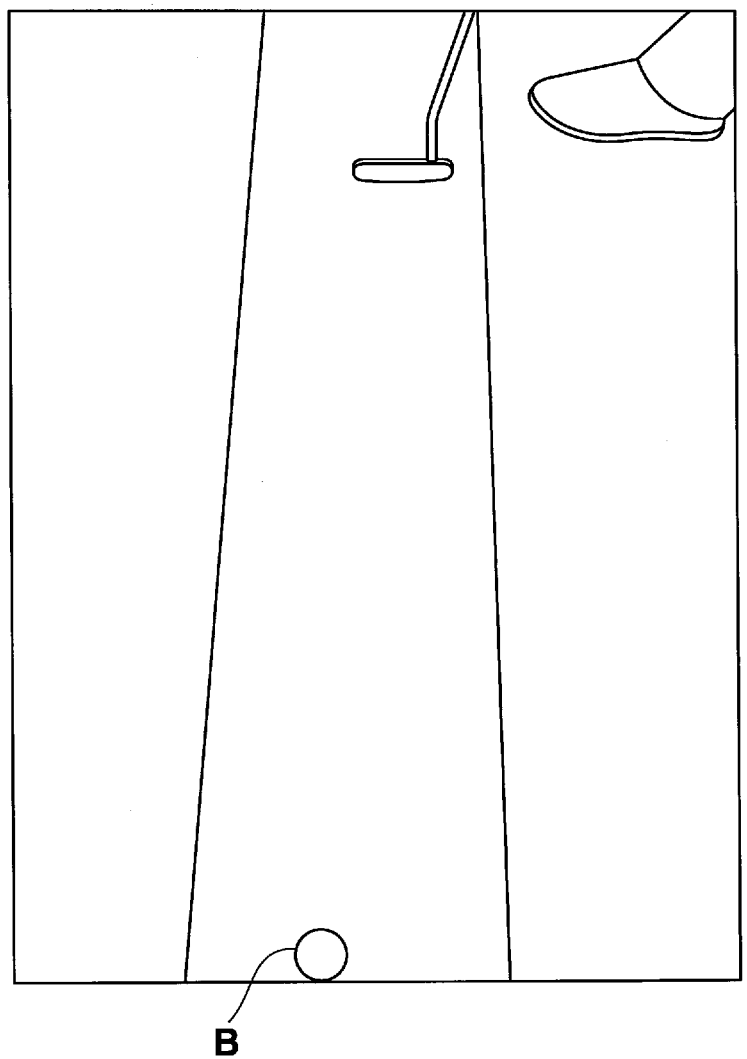
FIG. 5 is a diagram illustrating an example of an out-of-frame image that is processed by the image-capture device of FIG. 2.

FIG. 5 is a diagram illustrating an example of the out-of-frame image.

As shown in FIG. 5, in the out-of-frame image, the golf ball image has moved to the lower side of the drawing and the relative size of the golf ball image with respect to the framing image has become greater, compared to the impact frame image shown in FIG. 4.

Returning to FIG. 2, the identification unit 112 identifies a data group of a series of frame images from the impact frame image to the out-of-frame image as a moving image including an image of the golf ball B that moves after being hit by the golf club.

In addition, the identification unit 112 defines the time period elapsed between the capture of the impact frame image and the capture of the out-of-frame image as an observation period.

The rotation calculation unit 113 calculates the number of rotations of the golf ball based on data of the moving image including the image of the golf ball that moves after being hit by the golf club, identified by the identification unit 112.

Figure 6A:
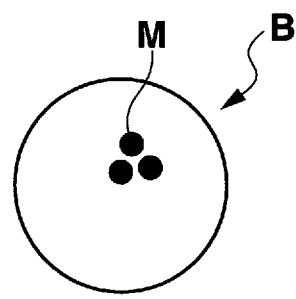
FIG. 6A is a diagram illustrating an example of a golf ball with a marking for calculation of number of rotations that is processed by the image-capture device of FIG. 2.
Figure 6B:
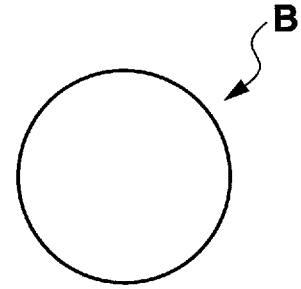
FIG. 6B is a diagram illustrating an example of a golf ball with a marking for calculation of the number of rotations that is processed by the image-capture device of FIG. 2.

FIGS. 6A and 6B are diagrams illustrating examples of a golf ball with a marking for calculation of the number of rotations.

In the present embodiment, for example as shown in FIG. 6A, the golf ball B is provided with a marking M thereon. As the golf ball B rotates, a frame image in which a marking M is visible on the golf ball image as shown in FIG. 6A and a frame image in which the marking M is invisible as shown in FIG. 6B appears alternately in the plurality of frame images constituting the moving image. The rotation calculation unit 113 calculates the number of rotations of the golf ball based on a phenomenon in which the marking M appears periodically within the observation period defined by the identification unit 112.

More specifically, in the present embodiment, the movement of the golf ball B during putting is realized by unidirectional rotation and accompanying slippage without rotation, and no other movement such as side spinning is expected. The user places the golf ball B with the marking M directed upward, and then hits the golf ball B. The golf ball B then moves by slipping, followed by moving by rotating. When viewed from the image-capture device 1 provided above, the golf ball B first moves with the marking M directed to the zenith. Thereafter, the golf ball B repeats movement in which the marking M moves in a moving direction of the golf ball B, disappears, and then reappears.

Given this, the rotation calculation unit 113 extracts data of a block (region image) of a predetermined size including the golf ball image, as data of a reference block, from the frame image in which the golf ball image is located at the initial position.

Here, in each of the plurality of frame images constituting the moving image within the observation period, the position and size of the golf ball image is identified by the identification unit 112. Given this, each time the image acquisition unit 111 inputs data of a frame image as a processing target, the rotation calculation unit 113 extracts data of a block of predetermined size including the golf ball image sequentially from the processing target, and then pattern-matches the extracted data with the data of the reference block. The pattern matching is performed each time for each item of data of the plurality of frame images within the observation period.

As a result of the pattern matching, the rotation calculation unit 113 obtains correlation of each item of data between the block from the processing target and the reference block, and then assigns a parameter indicating correlation (hereinafter referred to as "coefficient of correlation") to each of the plurality of frame images within the observation period.

Figure 7:
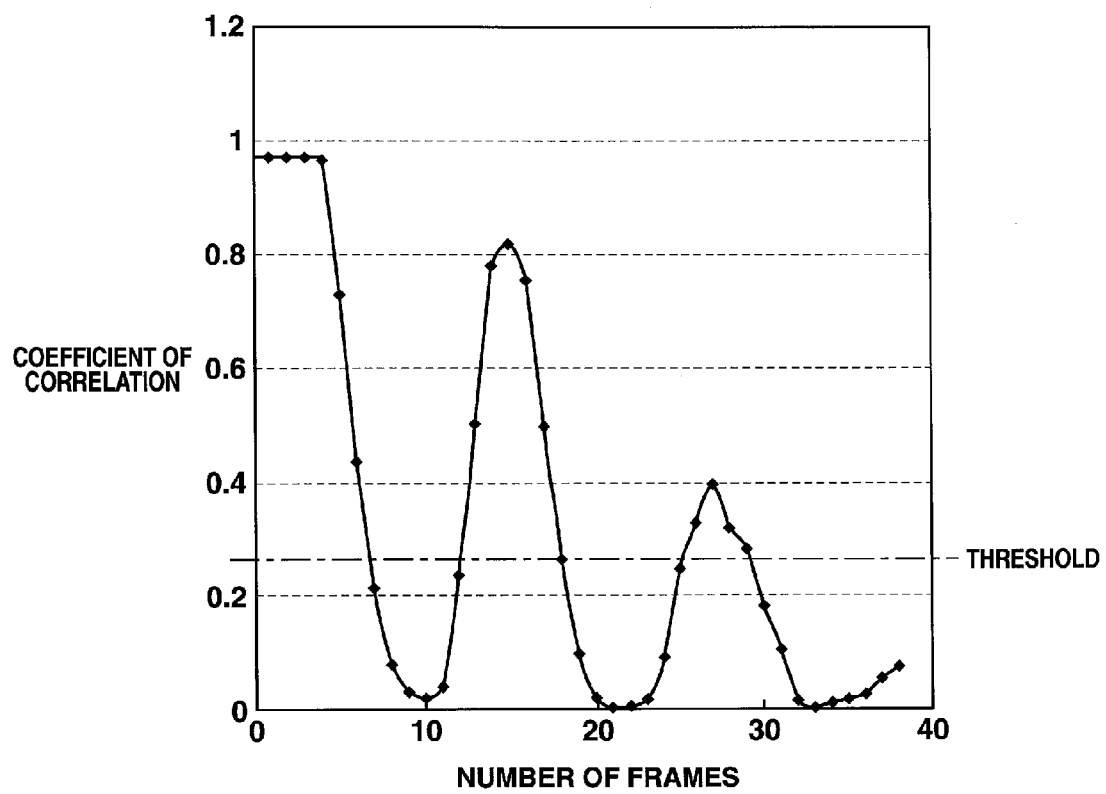
FIG. 7 is a diagram showing an example of a coefficient of correlation calculated by the image-capture device of FIG. 2.

FIG. 7 is a diagram showing the coefficient of correlation calculated by the rotation calculation unit 113.

In FIG. 7, an ordinate axis indicates the coefficient of correlation and an abscissa axis indicates each of the plurality of frames within the observation period. The "threshold" shown in FIG. 7 is a threshold defined in advance for determining whether the marking M on the golf ball B is captured or not.

Since the golf ball B moves by slipping after being hit by the golf club, an image of the marking M hardly changes. Therefore, the coefficients of correlation in several frame images immediately after being hit by the golf club are close to the maximum value, 1.

After moving by slipping, the golf ball B starts moving by rotation. Here, as the image of the marking M on the golf ball B in the block from the processing target approaches the position of the marking M in the reference block, the coefficient of correlation increases (perfect matching gives 1, the maximum value). In other words, as the golf ball B rotates and the position of the image of the marking M on the golf ball B in the block from the processing target moves away from the position of the marking M in the reference block, the coefficient of correlation decreases.

Given this, the rotation calculation unit 113 counts the number of occurrences of peaks, where the coefficient of correlation exceeds the threshold, and obtains the number thus counted as the number of rotations. The coefficients of correlation of the peaks decreases as the number of rotations increases because, as the golf ball B approaches the image-capture device 1 while rotating, the proportion of the golf ball image in the block in the frame image increases and the difference from the golf ball image at the initial position in the reference block becomes greater.

The coefficients of correlation can be calculated by a known formula. In the present embodiment, the coefficient of correlation CC is calculated according to Equation (4) below.

$$CC = \frac{\left(M\sum_{ij} G_{ij}F_{ij}\right) - \left(\sum_{ij} G_{ij}\right) \cdot \left(\sum_{ij} F_{ij}\right)}{\sqrt{\left\{\left(M\sum_{ij} G_{ij}^2\right) - \left(\sum_{ij} G_{ij}\right)^2\right\} \cdot \left\{\left(M\sum_{ij} F_{ij}^2\right) - \left(\sum_{ij} F_{ij}\right)^2\right\}}} \quad (4)$$

In Equation (4), M indicates the number of pixels included in the regional and the region a2. Gij indicates the pixel value (brightness and the like) of a pixel at a coordinate (i, j) in the reference block. Fij indicates the pixel value (brightness and the like) of a pixel at a coordinate (i, j) in the block from the frame image as the processing target.

It should be noted that the coefficient of correlation in FIG. 7 is the square of the coefficient of correlation CC calculated by Equation (4). The coefficient of correlation on the ordinate axis in FIG. 7 is thus always a positive value.

The movement amount calculation unit 114 calculates a total movement amount of the golf ball B including movement amount by slippage (slippage amount) and movement amount by rotation (rotational movement amount) of the golf ball B.

Figure 8:
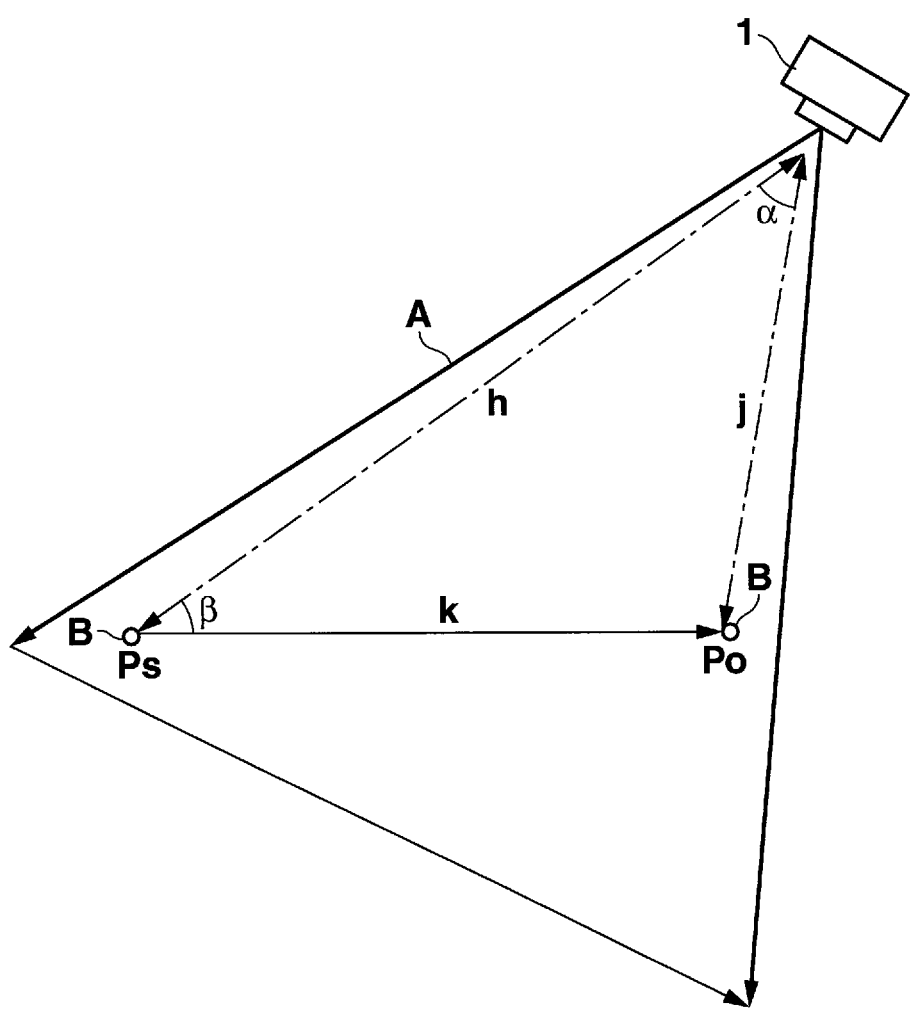
FIG. 8 is a diagram for describing a method of calculation of total movement amount by the image-capture device of FIG. 2.

FIG. 8 is a diagram for describing a method of calculation of the total movement amount by the movement amount calculation unit 114.

As described above, the image-capture device 1 is fixedly provided above the putting space and can capture an image of a real space of the capture range A, in the putting space, shown in FIG. 8.

In FIG. 8, the golf ball is stationary at a point Ps, which is the initial position, and starts moving from the point Ps to a point Po as the user hits the golf ball with the head of the golf club. The golf ball then goes out of a frame at the point Po (a state of 2 or 3 frames before disappearing from the capture range A).

The movement amount calculation unit 114 detects the diameter of the golf ball in the impact frame and detects a distance h between the image-capture device 1 and the golf ball at the point Ps based on the diameter. The movement amount calculation unit 114 also detects the diameter of the golf ball in the out-of-frame image shown in FIG. 5 and detects a distance j between the image-capture device 1 and the golf ball at the point Po based on the diameter.

Furthermore, the movement amount calculation unit 114 calculates an angle α between: a line segment connecting the image-capture device 1 and the point Ps, and a line segment connecting the image-capture device 1 and the point Po. A method of calculating the angle α is not limited in particular; for example, the following method is employed in the present embodiment.

In other words, in the present embodiment, a coordinate on a captured image and a coordinate on the (real-world) capture range A that is actually captured are associated with each other in advance. From the captured image, the movement amount calculation unit 114 obtains the initial position of the golf ball B that is identified by the identification unit 112 and the position of the golf ball B in the out-of-frame image. The movement amount calculation unit 114 identifies the real-world initial position of the golf ball B and the real-world position of the golf ball B immediately before exiting the capture range A based on the positions of the golf ball B on the captured image, and calculates the angle α.

The movement amount calculation unit 114 calculates the total movement amount k according to Equation (5) below, with the distance h, the distance j, and the angle α.

$$k^2 = h^2 + j^2 - 2 \cdot h \cdot j \cdot \cos \alpha \quad (5)$$

In assigning coordinates on the captured image to coordinates in the real world, characteristics of the image acquisition unit 17 and distortion of an optical lens unit in the image-capture device 1 may cause problems. In the present embodiment, it is assumed that a designer of the image-capture device 1 has an understanding of the relationship between a coordinate on the captured image and a coordinate in the real world, the relationship between a position on the captured image and the actual distance to the image acquisition device 1 therefrom, and the relationship between the calculated angle and the actual angle.

In addition, an LUT (Look Up Table) for correcting a coordinate on the captured image, a calculated distance, and calculated angle to an actual coordinate, the actual distance, and an actual angle can be stored in advance in the storage unit 20. In this case, the movement amount calculation unit 114 can obtain the more accurate total movement amount k by comparing the total movement amount k calculated by Equation (5) with the LUT.

In addition, the movement amount calculation unit 114 multiplies the number of rotations of the golf ball B calculated by the rotation calculation unit 113 by an already known circumference of the golf ball B, to thereby calculate the rotational movement amount of the golf ball B. It should be noted that the diameter of a golf ball is specified to be 1.68 inches based on International Specification. Therefore, the golf ball B has a fixed circumference.

The slippage amount calculation unit 115 subtracts the rotational movement amount of the golf ball B calculated by the movement amount calculation unit 114 from the total movement amount k calculated by the movement amount calculation unit 114. A distance thus obtained by the subtraction is considered to be a slippage amount that the golf ball B has moved by slipping.

According to the above-described configuration of the present embodiment, the user can understand the condition of putting based on the slippage amount in movement of the golf ball after being hit. The user can practice putting so as to reproduce slippage amount when he/she performs desired putting, based on the slippage amount and the actual condition of putting.

In the present embodiment, strict position adjustment is not necessary for equipment such as the image-capture device 1 or field of view of the capture range. The present embodiment can therefore allow the user to easily check his/her putting. In addition, since the image-capture device 1 does not require extremely high resolution in the present embodiment, the image-capture device 1, which can capture the entire capture range A, can be provided relatively inexpensively.

Next, a configuration for notifying the user of the slippage amount calculated by the above described configuration in the image-capture device 1 of the present embodiment is described.

In a case of controlling the slippage amount notification process, the slippage amount acquisition unit 116 and the notification control unit 117 function in the CPU 11 shown in FIG. 2. The slippage amount acquisition unit 116 obtains the slippage amount not only from the slippage calculation unit 115 but also from other image-capture devices via the communication unit 21.

The notification control unit 117 outputs the slippage amount output by the slippage amount acquisition unit 116 to the output unit 19 in the form of text, image, or sound, according to the output unit 19 type (display, speaker or the like).

Alternatively, in the present embodiment, the slippage amount acquisition unit 116 can be configured to output the slippage amount to the image processing unit 14, which then outputs an image that is displayed as a multi-motion image according to the slippage amount, to the output unit 19.

Multi-motion image processing is a series of processing to superimpose displays of: data of a multi-motion image in which consecutively captured images of a predetermined motion of an object (in the present embodiment, a golf ball) in the data of the acquired moving image are composed; and an object image representing the speed of the object included in the multi-motion image.

Figure 9:
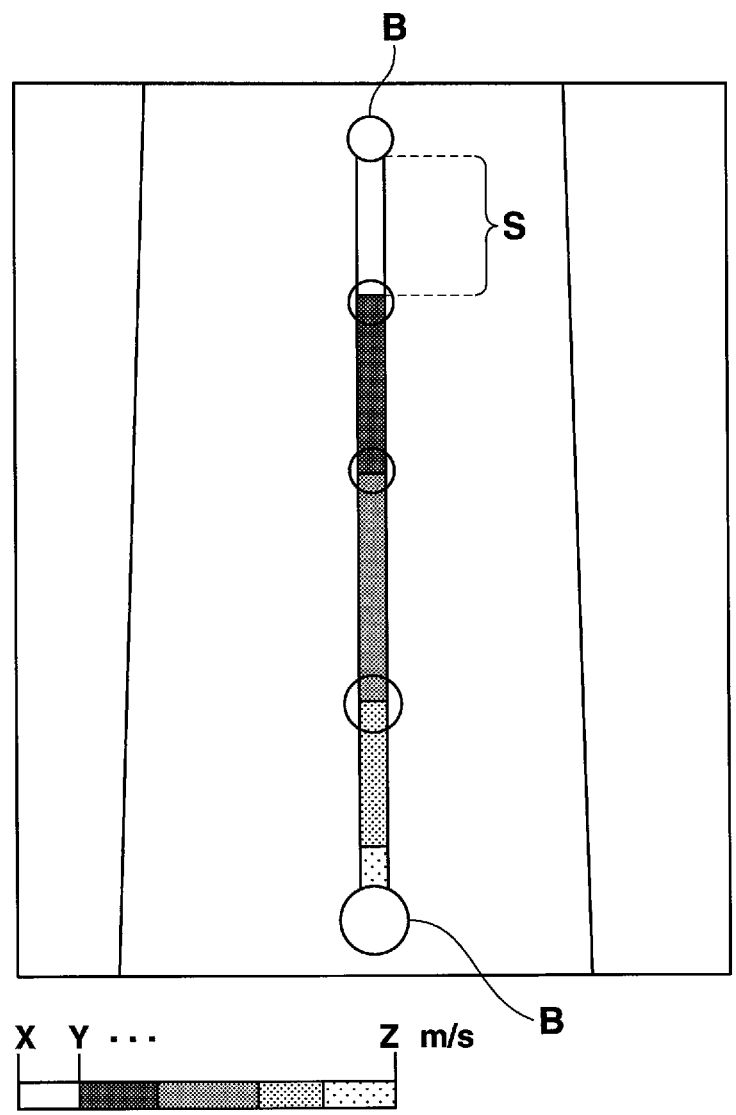
FIG. 9 is a diagram illustrating an example of a multi-motion image that is processed by the image-capture device of FIG. 2.

FIG. 9 is a diagram illustrating an example of the multi-motion image of the present embodiment, in which an image of the golf ball B is captured obliquely from above.

In FIG. 9, the slippage amount obtained by the slippage amount acquisition unit 116 is shown by "S". In a trajectory of the golf ball B outside of "S", a superimposed object image with shading corresponding to speeds of the golf ball B is displayed. As a result, a display can be realized that allows the user to more easily understand states of the golf ball that is moved by putting.

Furthermore, in the multi-motion image, colors of the objects in the region "S" can be changed according to the slippage amount.

It should be noted that, in the present embodiment, multi-motion display is not limited to that using the image of the golf ball captured from above, which is used for calculation of the slippage amount. For example, the multi-motion display with various compositions can be realized by capturing images of the golf ball B from different angles, in addition to the image for calculation of slippage amount.

Next, the slippage amount calculation process and the slippage amount notification process performed by the image-capture device 1 shown in FIG. 1 having the functional configurations shown in FIG. 2 are described with reference to FIGS. 10 to 14.

Figure 10:
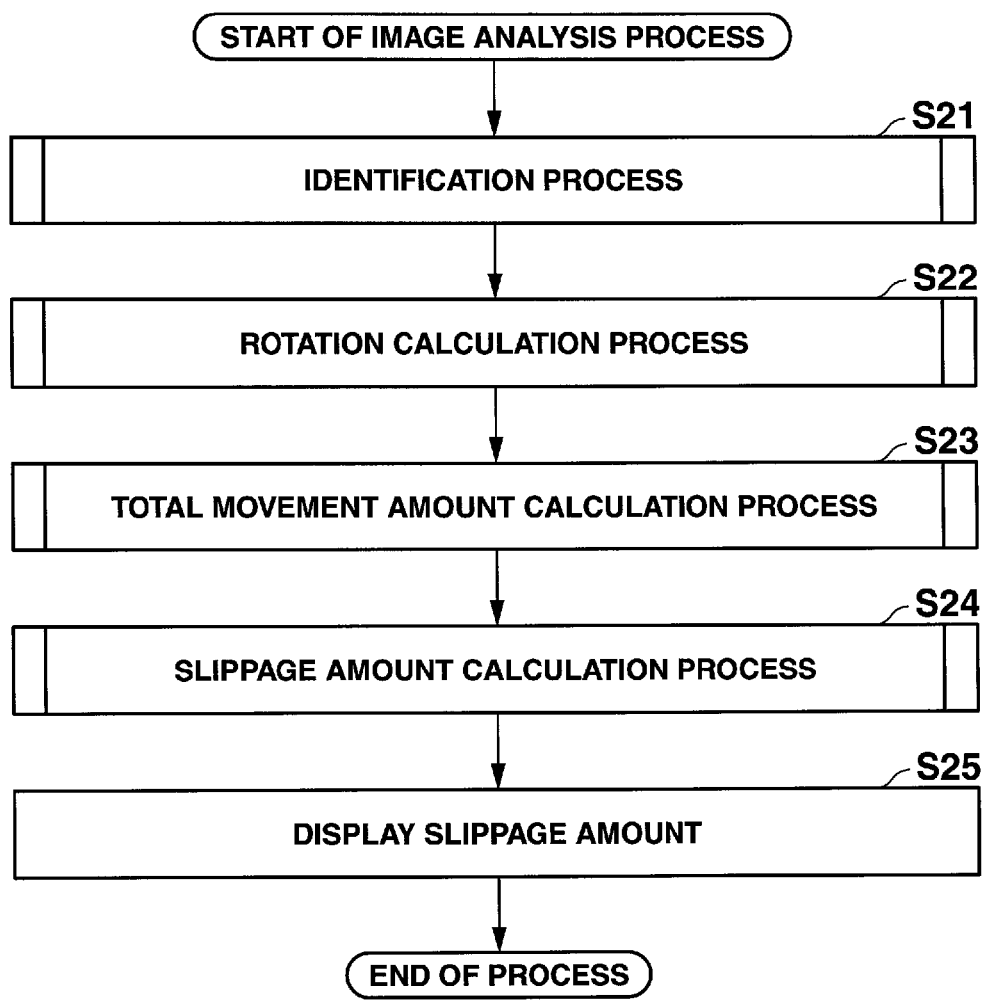
FIG. 10 is a flowchart for describing overall flow of the image analysis process to be executed by the image-capture device of FIG. 2.

FIG. 10 is a flowchart for describing overall flow of the image analysis process to be executed by the image-capture device 1 shown in FIG. 1.

The image analysis process is started when image capturing by the image-capture device 1 starts. The image-capture device 1 can start image capturing in response to, for example, an instruction to start image capturing given by the user who is about to begin putting practice.

In Step S21, the identification unit 112 identifies the impact frame image and the out-of-frame image by acquiring the golf ball image from the data of the plurality of frame images acquired by the image acquisition unit 111. The identification unit 112 then defines the time period elapsed between the capture of the impact frame image and the capture of the out-of-frame image as an observation period. The abovementioned series of processes is referred to as "identification process" in the present embodiment. The details of the identification process are later described with reference to FIG. 11.

In Step S22, the rotation calculation unit 113 calculates the number of rotations of the golf ball based on the data of frame images captured within the observation period defined by the identification unit 112. The abovementioned series of processes is referred to as "rotation calculation process" in the present embodiment. The details of the rotation calculation process are later described with reference to FIG. 12.

In Step S23, the movement amount calculation unit 114 calculates the total movement amount of the golf ball B including the slippage amount and the rotational movement amount of the golf ball B. In addition, the movement amount calculation unit 114 calculates the rotational movement amount of the golf ball. The abovementioned series of processes is referred to as "total movement amount calculation process" in the present embodiment. The details of the total movement amount calculation process are later described with reference to FIG. 13.

In Step S24, the slippage amount calculation unit 115 calculates the slippage amount by subtracting the rotational movement amount from the total movement amount of the golf ball B. The abovementioned series of processes is referred to as "slippage amount calculation process" in the present embodiment. The details of the slippage amount calculation process are later described with reference to FIG. 14.

In Step S25, the slippage amount acquisition unit 116 outputs the slippage amount calculated by the slippage amount calculation unit 115 or the slippage amount acquired from the communication unit 21 to the notification control unit 117. The notification control unit 117 notifies the user of the slippage amount by outputting the slippage amount to the output unit 19 in a mode suitable for the configuration or the like of the output unit 19.

Figure 11:
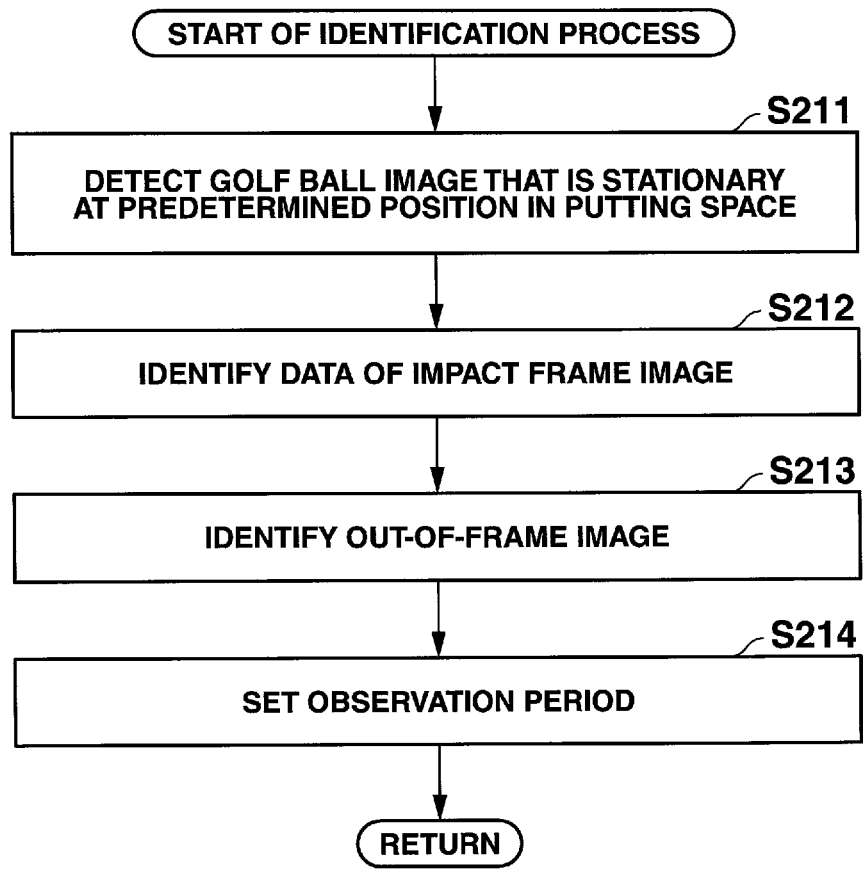
FIG. 11 is a flowchart for describing details of an identification process in the image analysis process of FIG. 10.

FIG. 11 is a flowchart for describing details of the identification process shown in Step S21 of FIG. 10. In Step S211, the identification unit 112 detects the golf ball image that is stationary at the initial position, from the plurality of frame images. The identification unit 112 determines the frame image including said golf ball image as the initial frame image.

In subsequent Step S212, the identification unit 112 identifies data of the impact frame image from the data of the frame image in which the characteristic amount difference for the region including the initial position is the maximum value.

In Step S213, the identification unit 112 detects data of frame images in which the separability is 0 or a value close thereto (no greater than a predetermined threshold), and identifies data of the out-of-frame image from data of the first frame image in which the separability becomes 0 or a value close thereto (no greater than a predetermined threshold). In Step S214, the identification unit 112 defines the time period elapsed between the capture of the impact frame image and the capture of the out-of-frame image, as an observation period.

Figure 12:
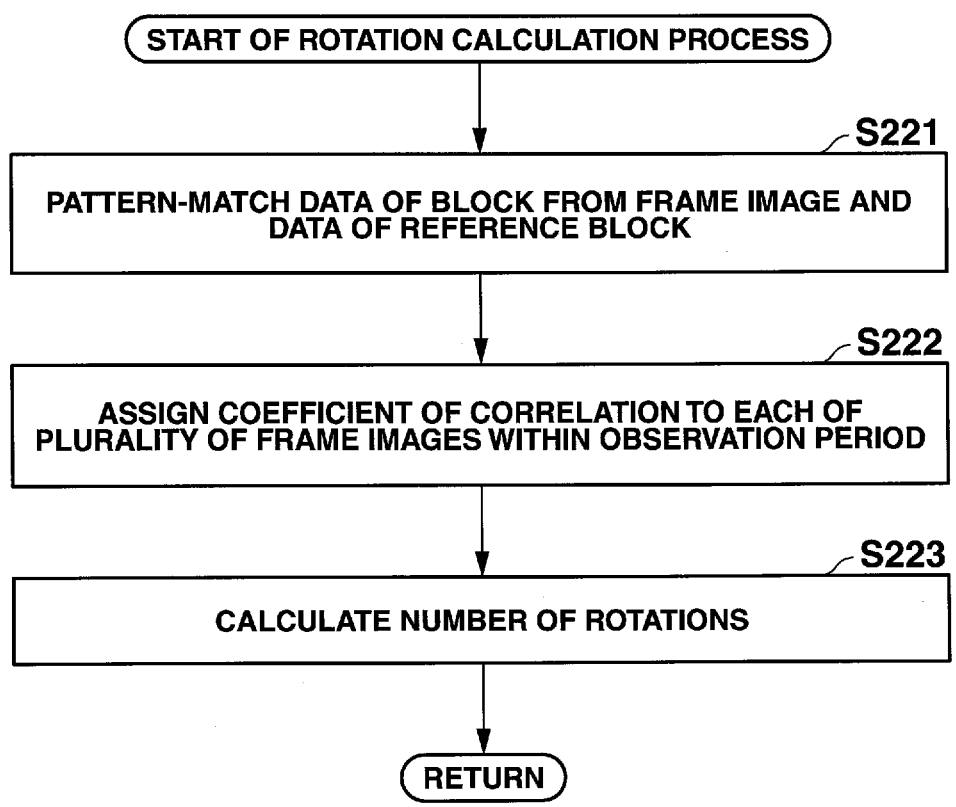
FIG. 12 is a flowchart for describing details of a rotation calculation process in the image analysis process of FIG. 10.

FIG. 12 is a flowchart for describing details of the rotation calculation process shown in Step S22 of FIG. 10.

In Step S221, from data of a frame image (processing target) being input by the image acquisition unit 111, the rotation calculation unit 113 extracts data of the region image sequentially from the processing target, and then pattern-matches the extracted data with the data of the reference block.

In Step S222, as a result of the pattern matching, the rotation calculation unit 113 obtains correlation of each item of data between the block from the processing target and the reference block, thereby calculating coefficients of correlation. The rotation calculation unit 113 then assigns the coefficient of correlation to each of the plurality of frame images within the observation period.

Furthermore, in Step S223, the rotation calculation unit 113 calculates the number of rotations of the golf ball B based on fluctuations in the coefficient of correlation thus calculated.

Figure 13:
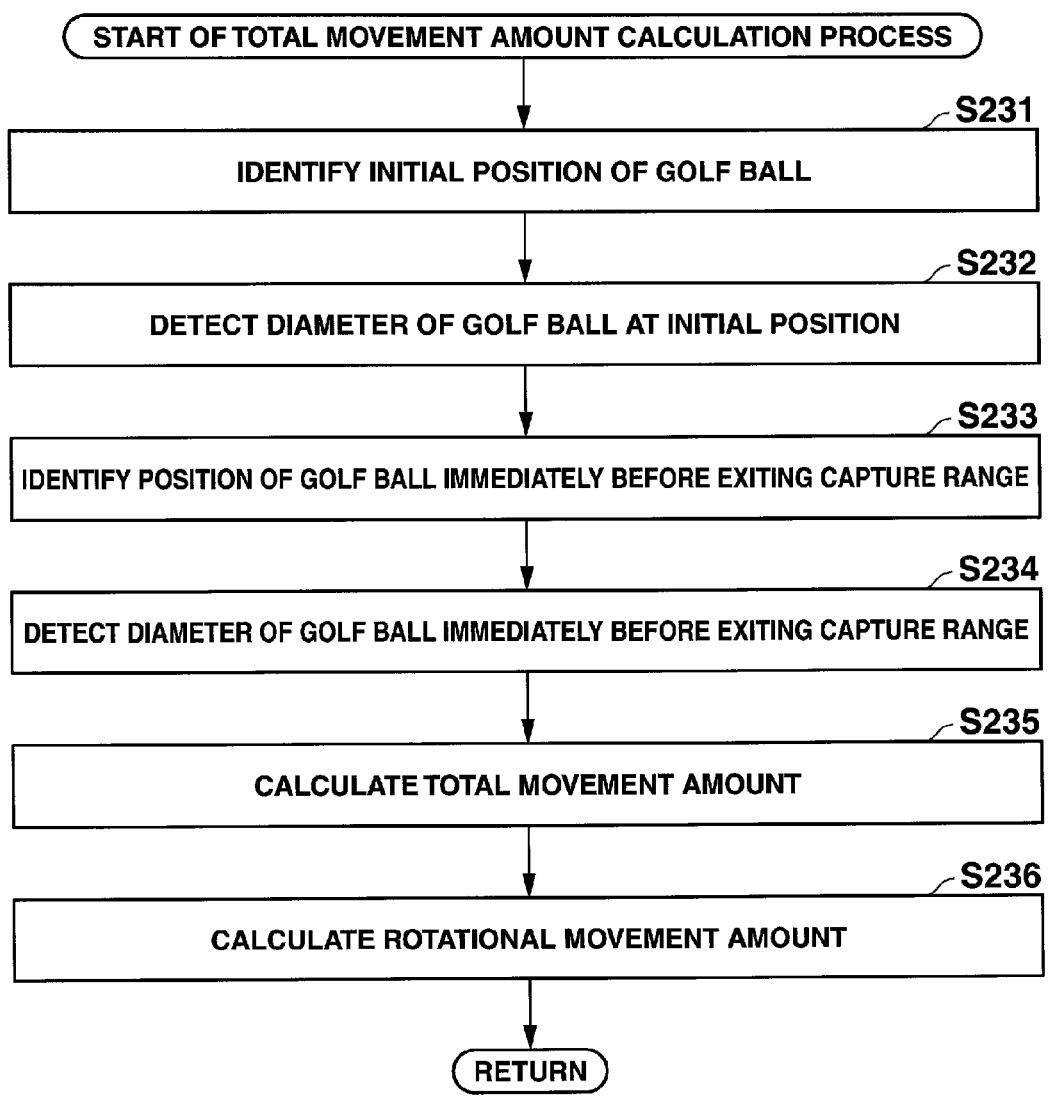
FIG. 13 is a flowchart for describing details of a total movement amount calculation process in the image analysis process of FIG. 10.

FIG. 13 is a flowchart for describing details of the total movement amount calculation process shown in Step S23 of FIG. 10. In Step S231, the movement amount calculation unit 114 identifies the real-world initial position of the golf ball B. In Step S232, the movement amount calculation unit 114 detects the diameter of the golf ball B in the impact frame image.

In Step S233, the movement amount calculation unit 114 identifies the real-world position of the golf ball B immediately before exiting the capture range. In Step S234, the movement amount calculation unit 114 detects the diameter of the golf ball B in the out-of-frame image shown in FIG. 5.

In Step S235, the movement amount calculation unit 114 calculates the total movement amount of the golf ball B based on the position thereof detected in the abovementioned steps and a distance between the image-capture device 1 and the golf ball B.

In Step S236, the movement amount calculation unit 114 calculates the rotational movement amount of the golf ball B based on the number of rotations thereof calculated by the rotation calculation unit 113.

Figure 14:
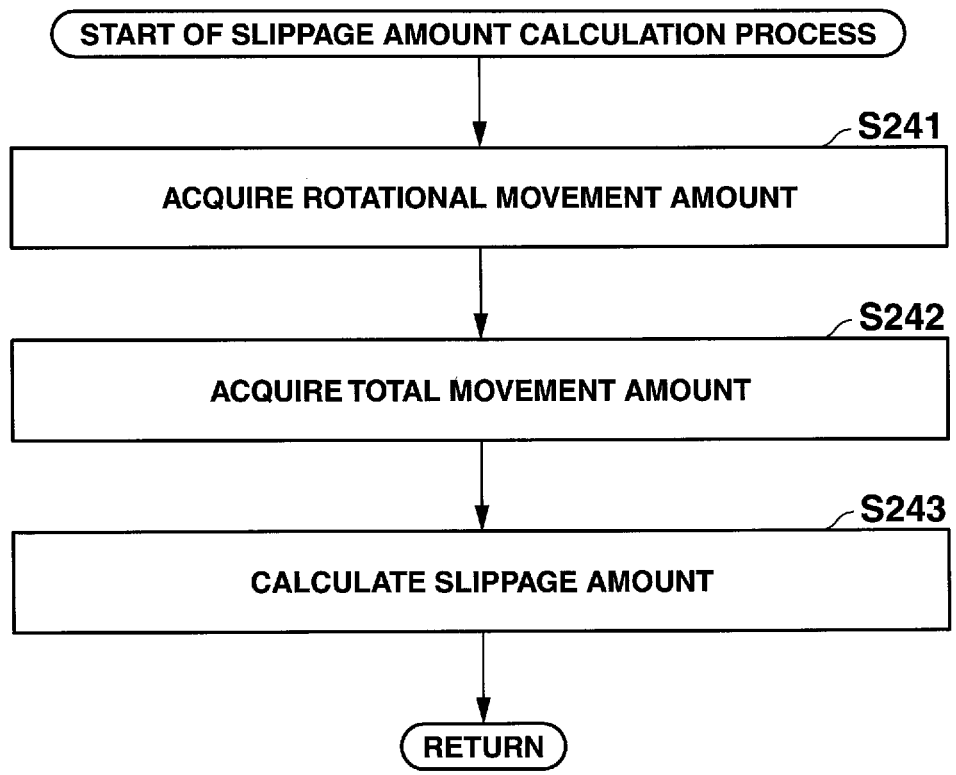
FIG. 14 is a flowchart for describing details of a slippage amount calculation process in the image analysis process of FIG. 10.

FIG. 14 is a flowchart for describing details of the slippage amount calculation process shown in Step S24 of FIG. 10. In Step S241, the slippage amount calculation unit 115 acquires the rotational movement amount of the golf ball B from the movement amount calculation unit 114. In Step S242, the slippage amount calculation unit 115 acquires the total movement amount of the golf ball B from the movement amount calculation unit 114.

In Step S243, the slippage amount calculation unit 115 calculates the slippage amount by subtracting the rotational movement amount from the total movement amount of the golf ball B.

According to the present embodiment described above, the slippage amount of the golf ball B can be easily calculated only with the image-capture device 1, without strictly adjusting the position of the golf ball B and the field of view. The user can then be notified of the slippage amount thus calculated.

It is known that the slippage amount of the golf ball B is one index representing the condition of putting. Since the slippage amount is a value obtained from actual putting performed by the user, the user would not find a substantial dissociation between the slippage amount and the putting.

Given this, according to the present embodiment, the index of the condition of putting can be obtained more easily by employing the image-capture device 1 for practicing golf, thereby filling the gap between the user's perception and the actual movement amount of the ball.

As described above, the image-capture device 1 that may be as in the above described embodiments and the like includes the image acquisition unit 111, the identification unit 112, the rotation calculation unit 113, the movement amount calculation unit 114, and the slippage amount calculation unit 115, as shown in FIG. 2.

The image acquisition unit 111 acquires a plurality of images that are successively captured.

The identification unit 112 identifies the golf ball B as the predetermined object in each of the plurality of images.

The rotation calculation unit 113 calculates the number of rotations of the golf ball B.

The movement amount calculation unit 114 calculates the total movement amount of the golf ball B.

The slippage amount calculation unit 115 calculates the slippage amount based on the number of rotations calculated by the rotational calculation unit 113 as well as the total movement amount.

The slippage amount of the image of the predetermined object included in the plurality of images that has successively been captured can thus be calculated. The gap between the user's perception and the actual movement distance of the golf ball can thus be removed.

The image-capture device 1 further comprises the notification control unit 117 that notifies information corresponding to the slippage amount, as shown in FIG. 2 and the like.

As a result, the image-capture device 1 can notify the user of the slippage amount, which is provided as an index of the condition of putting.

In addition, in the image-capture device 1, the identification unit 112 identifies the object in each of the plurality of images acquired by the image acquisition unit 111, based on separability of information between at least two different regions.

The object can thus be identified by using the separability filter.

As shown in FIGS. 6, 7 and the like, in the image-capture device 1, the rotation calculation unit 113 calculates the number of rotations of the object based on correlation between the reference image, which is a predetermined image including the predetermined object (the golf ball image at the initial position), and each of the plurality of images.

By pattern-matching each of the plurality of images with the reference image, the number of rotations of the predetermined object can be calculated.

Furthermore, in the image-capture device 1, the movement amount calculation unit 114 calculates the rotational movement amount, which is a distance that the golf ball B has moved only by rotational motion, based on the number of rotations calculated by the rotation calculation unit 113, as shown in FIG. 13 and the like. The slippage amount calculation unit 115 calculates the slippage amount by subtracting the rotational movement amount calculated by the movement amount calculation unit 114 from the total movement amount calculated by the movement amount calculation unit 114.

As a result, the slippage amount can be calculated by a relatively easy method.

In the image-capture device 1, the movement amount calculation unit 114 calculates the distance that the golf ball B as the predetermined object has moved, based on the plurality of images acquired by the image acquisition unit 111.

As a result, the movement distance of the golf ball B can be calculated using the plurality of images from which other kinds of information (for example, the number of rotations) have been acquired, without acquiring information separately for calculating the movement distance of the golf ball B.

The image-capture device 1 further includes the slippage amount acquisition unit 116 and the notification control unit 117 as shown in FIG. 2. The slippage amount acquisition unit 116 acquires information regarding the slippage amount of the predetermined object.

The notification control unit 117 notifies the information regarding the slippage amount acquired by the slippage amount acquisition unit 116.

As a result, the image-capture device 1 can notify the user of the slippage amount, which is provided as an index of the condition of putting.

It should be noted that the present invention is not to be limited to the aforementioned embodiment, and that modifications, improvements, etc. within a scope that can achieve the object of the present invention are also included in the present invention.

In the above described embodiment, the data of the image acquired by the image acquisition unit 111 is data of a plurality of frame images constituting the moving image being successively output by the image-capture unit 17; however, the present invention is not limited thereto, and any data of a plurality of images successively captured, such as data of a plurality of still images captured by what is called continuous shooting, can also be used. In addition, the image is not limited to that captured by the image-capture unit 17 of the image-capture device 1, and can be an image captured by another device not illustrated herein.

In addition, in the above described embodiment, the notification control unit 117 notifies as the slippage amount the value obtained by subtracting the rotational movement amount that the golf ball B, as the predetermined object, has moved by rotation from the total movement amount that the golf ball B has moved; however, the present embodiment is not limited thereto.

For example, the notification control unit 117 can notify as the slippage amount a ratio of the value thus calculated to the entire distance that the golf ball B has moved.

In other words, in the image-capture device 1, the movement amount calculation unit 114 calculates the rotational movement amount, which is a distance that the golf ball B has moved only by rotational motion, based on the number of rotations calculated by the rotation calculation unit 113. The slippage amount calculation unit 115 calculates the slippage amount by: subtracting the rotational movement amount calculated by the movement amount calculation unit 114 from the total movement amount calculated by the movement amount calculation unit 114; and then calculating the ratio of the value obtained by the subtraction to the total movement amount.

The ratio of the distance that the golf ball B has moved without rotating to the total movement amount can thus be calculated as the slippage amount in a relatively easy way.

In the above described embodiment, the image-capture device 1 to which the present invention is applied is a digital camera; however, the present invention is not particularly limited thereto.

For example, the present invention can be applied to any electronic apparatus in general having an image analysis function and an information notification function. More specifically, for example, the present invention can be applied to a lap-top personal computer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image-capture device 1 can be provided with the functions enabling the aforementioned processing sequence to be executed in its entirety.

A single functional block may be configured by a single item of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), a Blu-ray Disc, or the like.

The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

While some embodiments of the present invention have been described above, the embodiments are merely exemplification, and do not limit the technical scope of the present invention. Other various embodiments can be employed for the present invention, and various modifications with omissions or replacements are possible within a scope that does not depart from the spirit of the present invention. Such embodiments and modifications are included in the scope of the invention and the summary described in the present specification, and are included in the invention recited in the claims as well as a scope of equivalents thereof.

What is claimed is:

1. An image analysis apparatus comprising:
   an image acquisition unit that acquires a plurality of images that are successively captured;
   an identification unit that identifies a predetermined object in each of the plurality of images;
   a rotation calculation unit that calculates a number of rotations of the predetermined object;
   a first distance calculation unit that calculates a first distance that the predetermined object has moved; and
   a slippage amount calculation unit that calculates a slippage amount of the predetermined object based on the number of rotations and the first distance.

2. The image analysis apparatus according to claim 1 further comprising a notification unit that notifies information corresponding to the slippage amount calculated by the slippage amount calculation unit.

3. The image analysis apparatus according to claim 2, wherein the first distance calculation unit calculates the first distance based on the plurality of images.

4. The image analysis apparatus according to claim 1, wherein the identification unit identifies the object in each of the plurality of images, based on separability of information between at least two different regions.

5. The image analysis apparatus according to claim 4, wherein the first distance calculation unit calculates the first distance based on the plurality of images.

6. The image analysis apparatus according to claim 1, wherein the rotation calculation unit calculates the number of rotations of the object based on a correlation between a predetermined image including the predetermined object and each of the plurality of images.

7. The image analysis apparatus according to claim 6, wherein the first distance calculation unit calculates the first distance based on the plurality of images.

8. The image analysis apparatus according to claim 1 further comprising a second distance calculation unit that calculates a second distance that the predetermined object has moved only by rotational motion, from the number of rotations, wherein
the slippage amount calculation unit calculates as the slippage amount a value obtained by subtracting the second distance from the first distance.

9. The image analysis apparatus according to claim 8, wherein the first distance calculation unit calculates the first distance based on the plurality of images.

10. The image analysis apparatus according to claim 1 further comprising a second distance calculation unit that calculates a second distance that the predetermined object has moved only by rotational motion, from the number of rotations calculated by the rotation calculation unit, wherein
the slippage amount calculation unit calculates as the slippage amount a ratio of a value obtained by subtracting the second distance from the first distance, to the first distance.

11. The image analysis apparatus according to claim 10, wherein the first distance calculation unit calculates the first distance based on the plurality of images.

12. The image analysis apparatus according to claim 1, wherein the first distance calculation unit calculates the first distance based on the plurality of images.

13. An image analysis method performed by an image analysis apparatus that analyzes an image, comprising:
an image acquisition step of acquiring a plurality of images that are successively captured;
an identification step of identifying a predetermined object in each of the plurality of images acquired in the image acquisition step;
a rotation calculation step of calculating the number of rotations of the predetermined object identified in the identification step;
a first distance calculation step of calculating a distance that the predetermined object has moved; and
a slippage amount calculation step of calculating a slippage amount of the predetermined object based on the number of rotations calculated in the rotation calculation step and the distance calculated in the first distance calculation step.

14. A non transitory storage medium that stores a computer readable program, the program making a computer execute functions of:
an image acquisition unit that acquires a plurality of images that are successively captured;
an identification unit that identifies a predetermined object in each of the plurality of images;
a rotation calculation unit that calculates the number of rotations of the predetermined object;
a first movement amount calculation unit that calculates a distance that the predetermined object has moved; and
a slippage amount calculation unit that calculates a slippage amount of the predetermined object based on the number of rotations calculated and the distance.

* * * * *